US007565618B2

(12) United States Patent
Sheasby et al.

(10) Patent No.: US 7,565,618 B2
(45) Date of Patent: Jul. 21, 2009

(54) METHOD AND SYSTEM FOR DISTRIBUTING MULTIPLE DRAGGED OBJECTS

(75) Inventors: Michael Chilton Sheasby, Boucherville (CA); A. Michael Mondry, Nun's Island (CA)

(73) Assignee: LumaPix Inc., Quebec (CA)

( * ) Notice: Subject to any disclaimer, the term of this patent is extended or adjusted under 35 U.S.C. 154(b) by 575 days.

(21) Appl. No.: 10/761,314

(22) Filed: Jan. 22, 2004

(65) Prior Publication Data

US 2005/0166159 A1    Jul. 28, 2005

Related U.S. Application Data

(60) Provisional application No. 60/446,752, filed on Feb. 13, 2003.

(51) Int. Cl.
    *G06F 3/048* (2006.01)
(52) U.S. Cl. .................................. 715/769; 715/770
(58) Field of Classification Search ................ 715/769, 715/770
    See application file for complete search history.

(56) References Cited

U.S. PATENT DOCUMENTS

| 5,764,873 | A * | 6/1998 | Magid et al. ............... 715/769 |
| 2003/0107601 | A1 * | 6/2003 | Ryzhov ....................... 345/769 |
| 2006/0070007 | A1 * | 3/2006 | Cummins et al. ........... 715/769 |

OTHER PUBLICATIONS

IBM TDB, "Visual for Multiple-Icon Drag Movement", original publication date: Sep. 1, 1994, IP.com No. IPCOM000113664D, TDB v37 n9 Sep. 1994 p. 417-418.*
IBM TDB, "Adding and Removing Icons from a Multi-Icon", original publication date: Mar. 1, 1993, TDB v36 n3 Mar. 1993 p. 401-402.*
"Direct manipulation icon-pointer/interaction for multiple selections", published in Apr. 1990, RD Database No. 312044, RD Disclosure Journal No. 31244.*

* cited by examiner

*Primary Examiner*—William L Bashore
*Assistant Examiner*—Henry Orr
(74) *Attorney, Agent, or Firm*—Fish & Richardson P.C.

(57) ABSTRACT

A method and computer program executed by a processor is described for visually distributing a multiplicity of data objects within a visual computing environment. The user directly manipulates a cursor using a pointing device such as a computer mouse to sequentially indicate where a plurality of objects are to be positioned: these objects are presented as visual controls attached to the cursor, providing feedback as to the identification, order, and number of objects to be distributed. As the user indicates the desire to place the next-to-be dropped object (for example by clicking a button on the computer mouse), that object is dropped at the current cursor position, the representation of that object removed from the set of visual controls attached to the cursor, and the subsequent objects to be dropped advanced by one. The user may optionally re-order the objects to be dropped prior to actually dropping them, and may optionally exit and return to the dropping mode at any time.

20 Claims, 10 Drawing Sheets

FIGURE 1: COMPUTER SYSTEM

( PRIOR ART )

FIGURE 2: DRAG AND DROP [EXISTING ART]

Step 1: the user brings the cursor 20 over an object 21

Step 2: the user presses the left mouse button

Step 3: the user drags the mouse while holding the button down. An icon 22 representing the dragged object appears attached to the cursor 20

Step 4: the user releases the button on the mouse

FIGURE 3: VISUAL FEEDBACK [IMAGES]

FIGURE 4: VISUAL FEEDBACK [TEXT]

FIGURE 5: VISUAL FEEDBACK [MIXED DATA TYPES]

FIGURE 6: DISTRIBUTING DATA

FIGURE 7: PICKING UP ADDITIONAL DATA

Step 1: the user brings the cursor over a non-dragged object

Step 2: the user clicks the second mouse button

| Legend | |
|---|---|
| 20 | Cursor |
| 30a, 30b, 30c | Representations of data attached to cursor |
| 51 | Software Application |
| 51a, 51b, 51c, 51d | Regions of application user interface capable of containing data |
| 40a, 40b, 40c | Objects in file system |
| 52 | File System |

FIGURE 8: EXCHANGING DATA

Step 1: the user moves the cursor over a non-dragged object

Step 2: the user clicks the second mouse button

Step 3: the user moves the cursor over another non-dragged object and clicks the second mouse button Step 4: the user moves the cursor to the first location and clicks the first mouse button

Step 5: the user moves the cursor to the second location and clicks the first mouse button

| Legend | |
|---|---|
| 20 | Cursor |
| 30a, 30b, 30c | Representations of data attached to cursor |
| 51 | Software Application |
| 51a, 51b, 51c, 51d | Regions of application user interface capable of containing data |

FIGURE 9: LIST MANIPULATION

Step 1: prior to interaction

Step 2: the user has rolled the list of dragged object forward by one

| | Legend |
|---|---|
| 20 | Cursor |
| 30a, 30b, 30c | Representations of data attached to cursor |

FIGURE 10: ENHANCED VISUAL FEEDBACK

10a: Truncated Visuals

10b: Numbered Truncated Visuals

10c: Gradient Truncated Visuals

| Legend | |
|---|---|
| 20 | Cursor |
| 30 | Collection of graphical representations of dragged objects |
| 30a, 30b, 30c | Representations of data attached to cursor |
| 50 | Counter representing 2 unseen dragged objects |
| 51 | Fade effect indicating additional unseen dragged objects |

METHOD AND SYSTEM FOR DISTRIBUTING MULTIPLE DRAGGED OBJECTS

The present application formalizes the provisional application with application No. 60/446,752 and confirmation number 4649, filed Feb. 13, 2003.

CROSS-REFERENCE TO RELATED APPLICATIONS

The present invention shares the same inventors and assignee as, and is related to, the following applications:

60/446,757, entitled "METHOD AND SYSTEM FOR INTERACTIVE CROPPING OF A GRAPHICAL OBJECT WITHIN A CONTAINING REGION", as well as 60/446,751, entitled "METHOD AND SYSTEM FOR INTERACTIVE REGION SEGMENTATION", in that the methods of region segmentation and object cropping described therein may optionally be combined with the user interface elements described herein.

FIELD OF THE INVENTION

The present invention relates particularly to a computer user interface incorporating drag and drop functionality and more particularly to a graphics imaging system that involves the arrangement of a plurality of graphical objects such as bitmaps.

BACKGROUND OF THE INVENTION

User input devices for computers such as a mouse allow the user to interactively manipulate visual representations of objects such as files by "dragging and dropping" them, by which we mean the sequential acts of positioning the cursor over an object using a pointing device such as a mouse, toggling a control such as a mouse button, moving the pointing device, and releasing the control. This action can accomplish a variety of tasks, for example to rearrange data within a single application or to transport the data between disparate applications.

In existing art, the dragged object is typically displayed as an icon, often with decorations pulled from a broadly-accepted set of iconic language conventions. These icons indicate variants on the basic drag/drop technique (the dragging of a plurality of objects, a drag which will result in a copy of the dragged object, a drag which will result in a reference to the dragged object, etc). In existing art, when multiple objects are being dragged then all are released simultaneously at the moment when the user releases the control to end the drag operation.

The present invention improves upon existing art by providing the user with visual feedback as to the specific content of the list of dragged objects, enabling the user to edit that list prior to dropping the objects, enabling the user to temporarily leave and return to the dragging mode, and enabling the user to distribute multiple dragged objects sequentially.

SUMMARY OF THE INVENTION

The present invention provides for an interaction technique, implementable on a computer readable medium for interactively distributing data within a display using an input device.

The invention builds upon existing art for "Dragging and Dropping", a technique for moving data contained within one or many objects from one location to another within a user interface via manipulation of a pointing device such as a computer mouse.

In one aspect of the invention, the user can distribute a plurality of dragged objects one at a time, as opposed to dropping them all simultaneously as in existing art.

In another aspect of the invention, the user is presented with a visual representation of the set of dragged objects, for example as a row or column of thumbnails to represent a dragged plurality of image data objects.

In another aspect of the invention, the user is able to abort or temporarily suspend the drag-and-drop operation, for example to perform operations on the surface that is to receive the dragged data prior to continuing with the process of distributing dragged data to said surface.

In another aspect of the invention, the visual representation of the dragged data can be limited in size such that only a fixed number of dragged data objects are represented in the display; unrepresented data still exists in the set of dragged data but are not represented to the user. In this event, the present invention describes mechanisms for indicating the presence of unseen dragged data, such as a transparency gradient on the last visible dragged object.

In another aspect of the invention, the user is able to manipulate the set of dragged data prior to dropping it, for example to rotate the indices of the sets to bring another object to the top of the list such that it will be the next object dropped.

In another aspect of the invention, the user can pick up data from the interface and add it to the set of dragged data even during the drag-and-drop operation, which in existing art only allows the user to drop data.

BRIEF DESCRIPTION OF THE DRAWINGS

A specific embodiment of the invention will now be described, by way of example, with reference to the accompanying drawings in which.

DETAILED DESCRIPTION

In the following discussion, the present invention is described for illustrative purposes with reference to the manipulation of raster image information. However, one of ordinary skill in the art will recognize that the invention, in its broadest aspect, is applicable to applications other than image applications, and it is not intended that the scope of the invention be so limited. For example, the present invention is also applicable to any task involving the transport of data from location to location, including without limitation tabular "spreadsheet" data, files in an operating system, or text in a word processor.

Computer Imaging System

Figure 1:
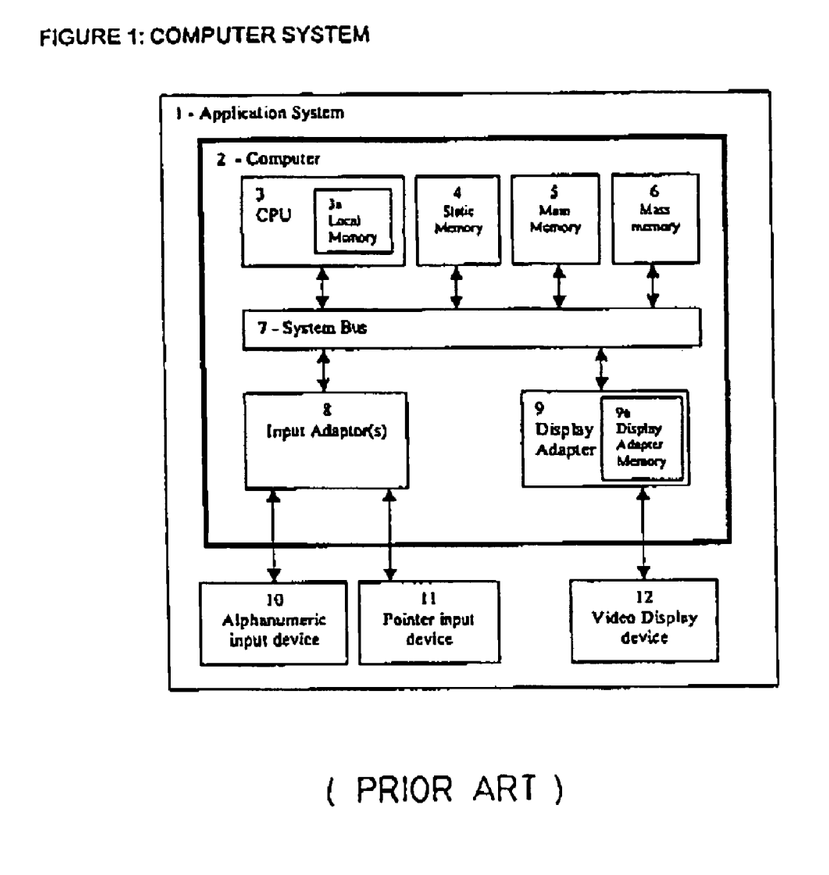
FIG. 1 is a drawing of a computer system suitable for implementing a system for segmenting regions, according to the present invention.

A computer-based system 1 suitable for use of this invention is schematically depicted in FIG. 1. The application system 1 includes a computer 2 that has a central processing unit (CPU) 3 which may include local memory 3a, static memory 4 such as Read-only memory (ROM), main memory 5 such as Random Access memory (RAM), mass memory 6 such as a computer disk drive, a system bus 7, adaptor(s) for external input devices 8, and a display adapter 9 which may include local memory 9a. The computer 2 communicates with an alphanumeric input device 10 such as a keyboard, a pointing device 11 such as a mouse for manipulating a cursor and making selections of data via said input adapter 8. The computer 2 communicates with a video display 12 such as a computer monitor via said display adapter 9.

With reference to the pointing device 11 some aspects of the invention below are optimally executed on a mouse offering a plurality of button devices (herein described as the first and second buttons on the mouse) and/or exposing a thumb-wheel device (a mechanical control enabling the user to increment or decrement values by rolling a wheel or otherwise manipulating an affordance other than the overall position of the mouse device itself).

The computer 2 executes imaging software described below to allow the system 1 to render high quality graphics images on the monitor 12. The CPU 3 comprises a suitable processing device such as a microprocessor, for example, and may comprise a plurality of suitable processing devices. The graphics adaptor 9 may also be capable of executing instructions. Instructions are stored in the CPU local memory 3a, static memory 4, display adapter local memory 9a, main memory 5, and/or mass memory 6 and are executed by the CPU 3 or the display adapter 9.

The static memory 4 may comprise read only memory (ROM) or any other suitable memory device. The local memory may store, for example, a boot program for execution by CPU 3 to initialize the graphics imaging system 1. The main memory 5 may comprise random access memory (RAM) or any other suitable memory device. The mass memory 6 may include a hard disk device, a floppy disk, an optical disk, a flash memory device, a CDROM, a file server device or any other suitable memory device. For this detailed description, the term memory comprises a single memory device and any combination of suitable devices for the storage of data and instructions.

The system bus 7 provides for the transfer of digital information between the hardware devices of the system 1. The CPU 3 also receives data over the system bus 7 that is input by a user through alphanumeric input device 10 and/or the pointer device 11 via an input adaptor 8. The alphanumeric input device 10 may comprise a keyboard, for example, that comprises alphanumeric keys. The alphanumeric input device 10 may comprise other suitable keys such as function keys for example. The pointer device 11 may comprise a mouse, track-ball, tablet and/or joystick, for example, for controlling the movement of a cursor displayed on the computer display 12.

The system 1 of FIG. 1 also includes display adapter hardware 9 that may be implemented as a circuit that interfaces with system bus 7 for facilitating rendering of images on the computer display 12. The display adapter hardware 9 may, for example, be implemented with a special graphics processor printed circuit board including dedicated random access memory 9a that helps speed the rendering of high resolution, color images on a viewing screen of the display 12.

The display 12 may comprise a cathode ray tube (CRT) or a liquid crystal display particularly suited for displaying graphics on its viewing screen. The invention can be implemented using high-speed graphics workstations as well as personal computers having one or more high-speed processors.

The system 1 utilizes specialized graphics software particularly suited to take advantage of the imaging hardware included in the display system 1 depicted in FIG. 1. The software implements a user interface and related processing algorithms as described in subsequent sections to enable the user to produce works viewed on the display 12 and which may be stored in mass memory 6.

Dragging and Dropping

Figure 2:
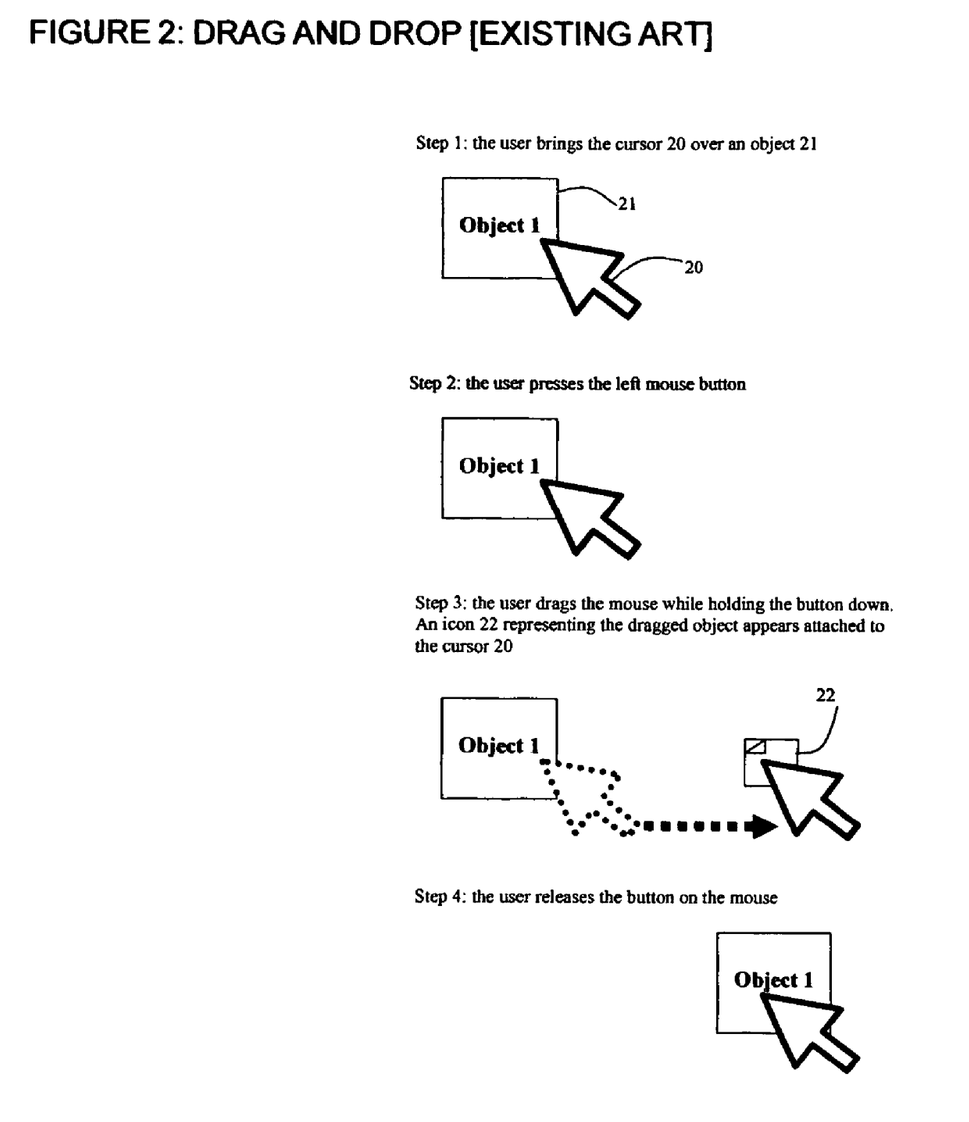
FIG. 2 depicts the phases of the drag-and-drop operation as practiced in existing art.

As illustrated in FIG. 2, in existing art the basic act of dragging and dropping an object is executed as per the following steps:

1. positioning the cursor 20 over an object 21 using a pointing device such as a mouse 11
2. pressing a button on the mouse 11
3. moving the mouse 11
4. releasing the button on the mouse 11.

This action is performed in a wide variety of applications and to accomplish a wide variety of tasks, such as:

moving files from folder to folder in the operating system
moving graphical objects from location to location within a structured graphics application
moving a selection of textual data from location to location within a text editing application In existing art, the cursor typically changes from a default icon 20 to an icon indicating that an object is being dragged 22.

In existing art the cursor may also represent that multiple objects are being dragged if this is the case. A typical mechanism is via the appending of a '+' icon to the regular drag icon 22.

In existing art, when multiple objects are dropped, they are all dropped at the moment the user releases the button on the mouse 11.

Visual Feedback

Figure 3:
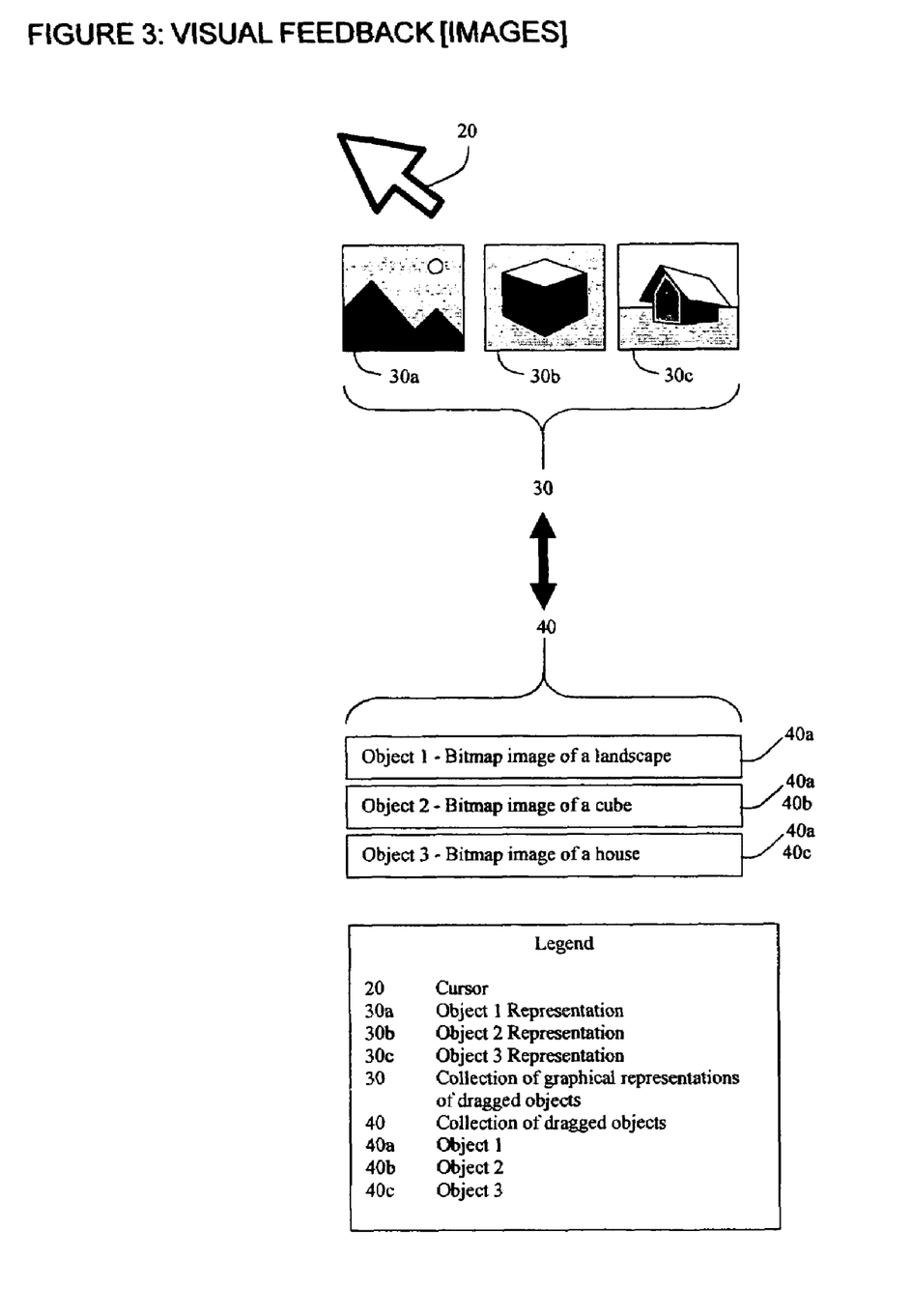
FIG. 3 depicts visual feedback during drag-and-drop of a set of image objects (in the form of a row of image thumbnails)

In the preferred embodiment of the invention, as shown in FIG. 3, during dragging operations the cursor is appended with a collection of visual representations 30 of the collection of dragged objects 40. In particular the specific content of the dragged objects 40a, 40b, 40c is reflected in a visual presentation 30a, 30b, 30c respectively. This provides the user with several pieces of information:

the number of datum that remain to be dropped (in FIG. 3, three items)
the specific identities of the data being dragged (in FIG. 3, the items are landscape, a 3D cube, and a picture of a house))
the order in which they will be dropped (in FIG. 3, the order is 40a, 40b, 40c)

The visual representation may vary based on the class of object being dragged.

For example, as illustrated in FIG. 3, if the user is dragging a selection of graphical objects 40, said visual representation 30 may consist of a matrix or list of reduced-scale representations of said graphical objects 40 such that the user can visually distinguish the items contained.

Figure 4:
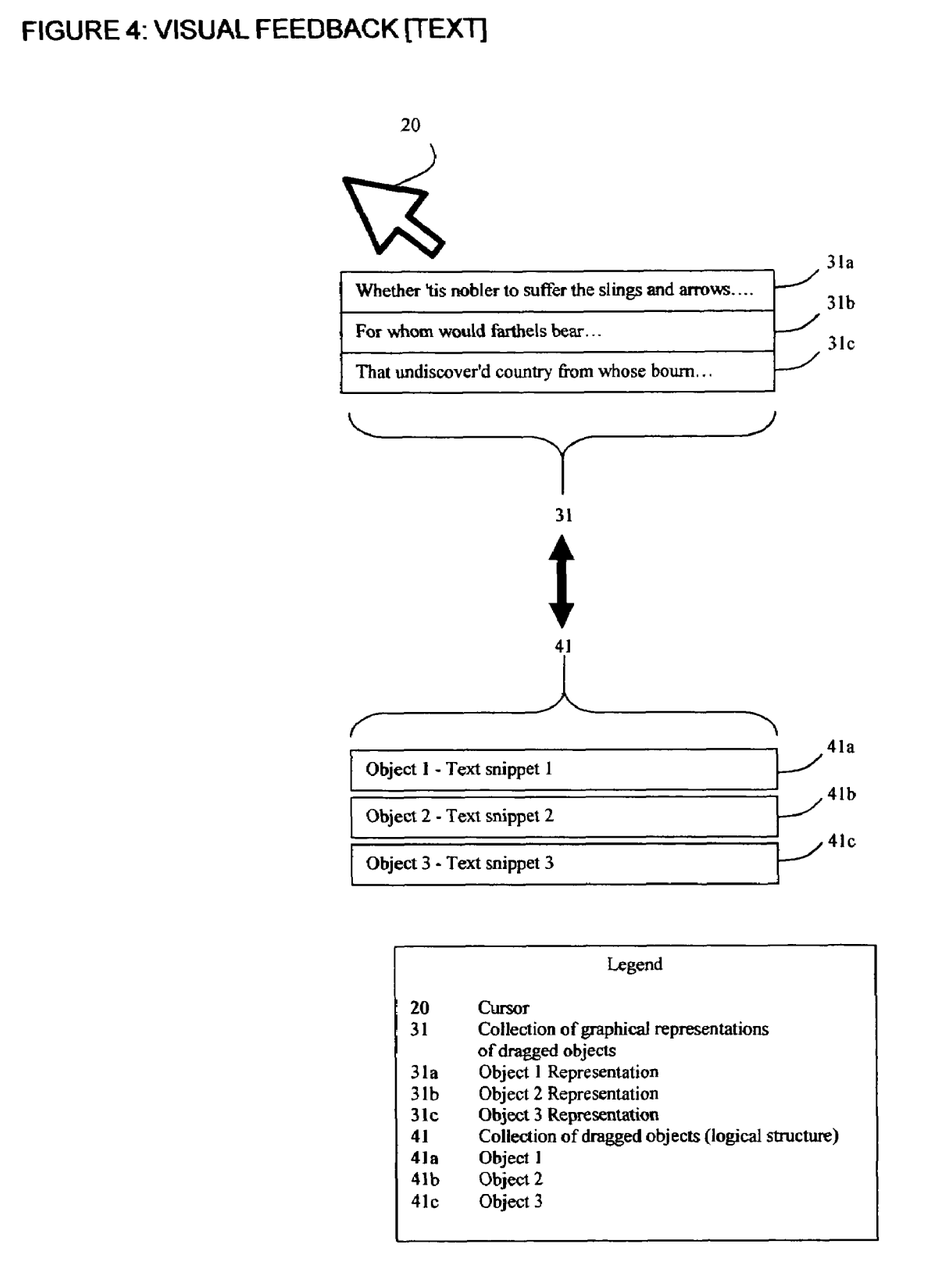
FIG. 4 depicts visual feedback during drag-and-drop of a set of textual data (in the form of a column of text items)

As illustrated in FIG. 4, if the user is dragging a selection of textual objects 41, said visual representation 31 may consist of a matrix or list of representations of the first several words of said textual objects 41a, 41b, 41c such that the user can again visually distinguish the items contained.

Figure 5:
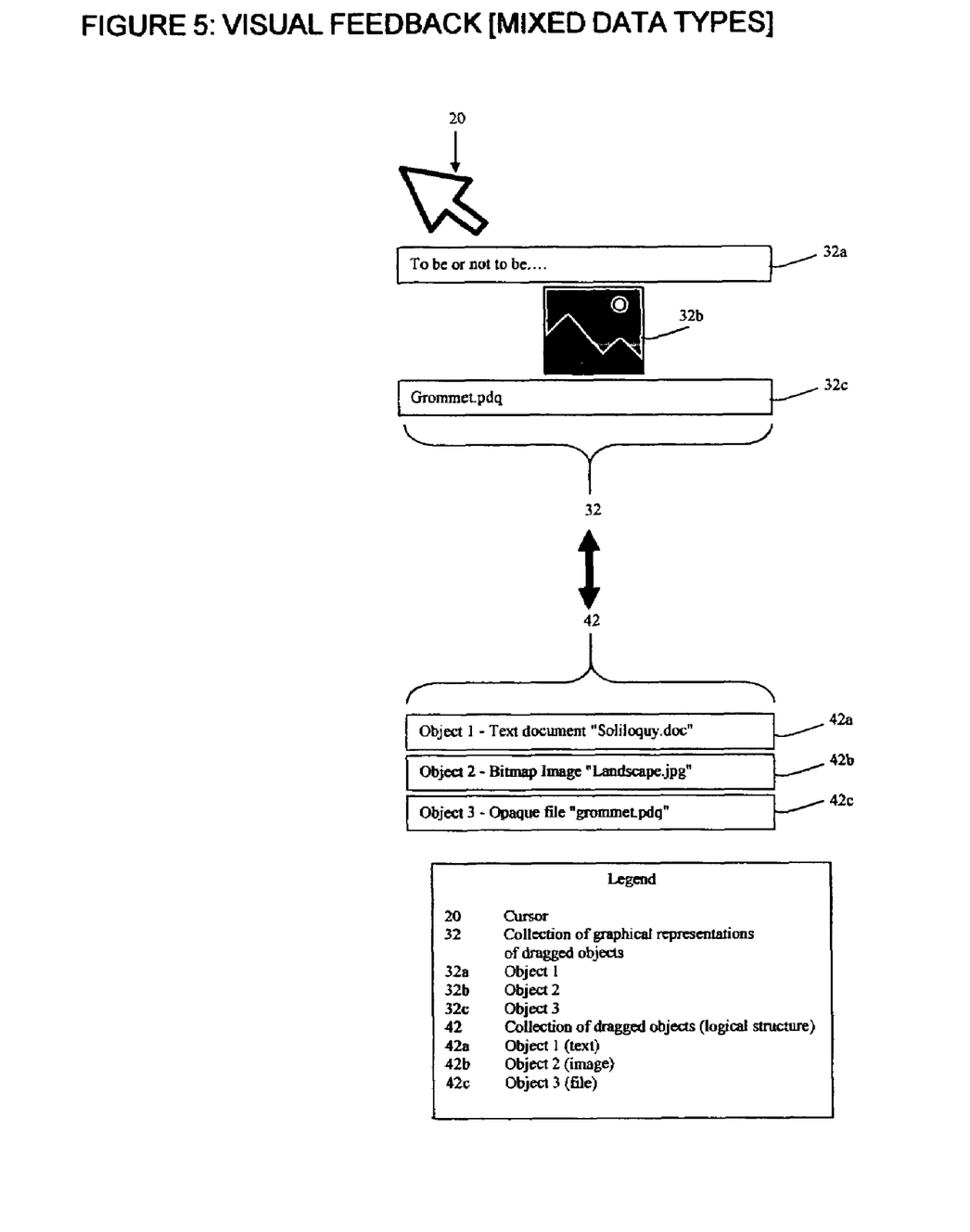
FIG. 5 depicts visual feedback during drag-and-drop of a set of mixed graphical, textual, and other data) in the form of a column of heterogenous display types.

As illustrated in FIG. 5, if the user is dragging a selection of file objects 42, said visual representation 32 may consist of a heterogeneous matrix or list of representations of the filename only 32c (for unknown file types 42c), reduced-size images 32b for recognized graphical file objects (such as JPEG images 42b), or textual extracts 32a for recognized document file objects (such as text files 42a).

As the user continues to move the cursor 20 about using the pointing device 11, said collection of icons 30, 31, 32 maintains its position relative to the cursor 20 such that it appears attached to said cursor 20.

Said collection of icons 30, 31, 32 may be arranged in a horizontal list rooted at the cursor 20 (as illustrated in FIG. 3), a vertical list rooted at the cursor 20 (as illustrated in FIG. 4), or other arrangements.

For illustrative purposes, consider the following pseudo-code example:

```
OnDraw( DeviceContext DC )
{
  // The display view of the current document is being updated
  // Draw the display view as appropriate to the current mode
  ...
  If ( the user is in drag-and-drop mode )
  {
    CPoint CurrentPoint = GetCursorPosition( ) + CPoint( 20, 20 );
    // decide how many thumbnails to draw
    int Count = min( MAX_NUM_DISPLAYED_THUMBNAILS,
    GetNumDraggedItems( ) );
    CPoint Offset;
    for ( int i = 0; i < Count; i ++ )
    {
      // draw the item
      // the mechanics of drawing different types of objects
      // (graphics, files, text) are taken care of in the
      // CDraggableItem-derived class representing that type of
      object
      CDraggableItem * DraggedItem = GetDraggedObjectList( i );
      Offset = DraggedItem->Draw(
        DC,
        CurrentPoint,
        CRect(
          CurrentPoint,
          CurrentPoint + CPoint( 40, 40 )
        ) );
      // move to next position
      switch ( mDIRECTION )
      {
        case VERTICAL:
          CurrentPoint += Offset.Y;
          break;
        default:
          CurrentPoint += Offset.X;
          break;
      }
    }
  }
}
```

Multiple Drops

If multiple objects are being dragged by the user, then they form an ordered set. Said set is typically sorted by the order in which said objects were selected, although one of average skill in the art could conceive of other sort criteria, including but not limited to file creation date, alphanumeric sort of text objects, or image size.

The current method differs from existing art by providing for the sequential distribution of said dragged objects. In particular, when the user releases the mouse button during the drag operation, the entire set of objects is not dropped to the receiving application as in existing art.

Instead, with reference to FIG. 3, in one embodiment of the current invention, only the first object 40a of the collection of dragged objects 40 is dropped when the button on the mouse 11 is released; the remaining objects remain ready for dropping with visual representations 30b and 30c attached to the cursor 20.

In another embodiment, none of the collection of dragged objects 40a is dropped when the button on the mouse 11 is released; visual representations 30 all objects remain attached to the cursor 20.

In either embodiment, the system 1 enters a new mode when the button on the mouse is released with two or more objects remaining to be dropped, referred to herein as "drop mode".

While in drop mode, the objects remaining to be dropped are sequentially dropped to the application with the first object 40a in the list of undropped objects 40 being dropped when the user presses and releases the button on the mouse 11.

When said drop occurs, the collection of dragged objects 40 is reduced by the dropped object 40a. This reduction is reflected in the collection of visual representations of said objects 30 attached to the cursor 20: a visual representation of the dragged object subsequent to the just-dropped object (40b in this example) appears first in the onscreen collection of objects 30.

Figure 6:
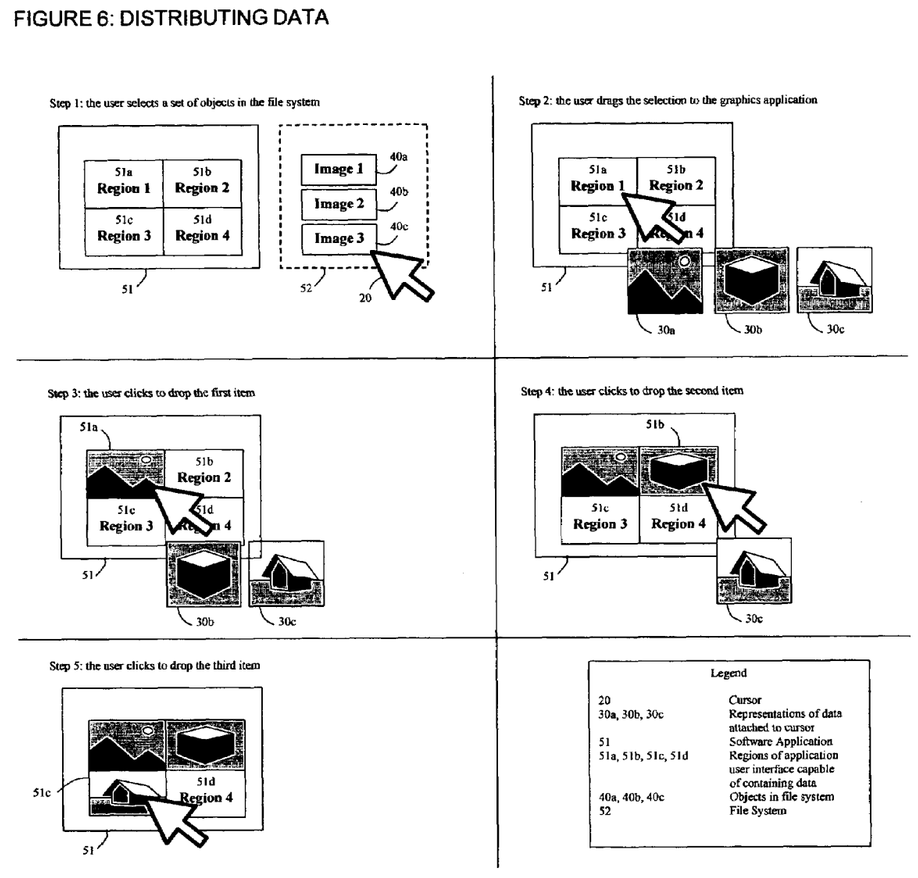
FIG. 6 depicts the steps involved in sequentially distributing multiple dragged data items to an application.

The drop mode is of particular use for distributing objects in a target application. By way of illustration, as shown in FIG. 6, the user selects a set of graphical images 40a, 40b, 40c from the file system 52 and distributes them one at a time into various bounded regions 51a, 51b, 51c within a graphics application 51 to compose a Collage graphic work. One of average skill in the art could conceive of other target applications wherein sequential drops would accelerate workflow, such as distributing multiple selected text objects within tabular or linear text documents.

When the user has dropped all dragged objects and the collection 30 is empty, drop mode is exited and the application returns to other modes of function.

In another embodiment of the invention, the user can additionally exit drop mode prior to dropping all dragged objects 40, for example by pressing the 'esc' key. This has the effect of clearing the collection of dragged objects 40 and exiting drop mode immediately.

Adding to the List of Dropped Objects

In another embodiment of the invention, the user has the ability to pick up data objects: to add them to the collection of dragged objects.

This operation can be applied at any time, including during the interval in which the user is in drop mode with an existing collection of dragged objects 40 with visual references 30 attached to the cursor 20.

Figure 7:
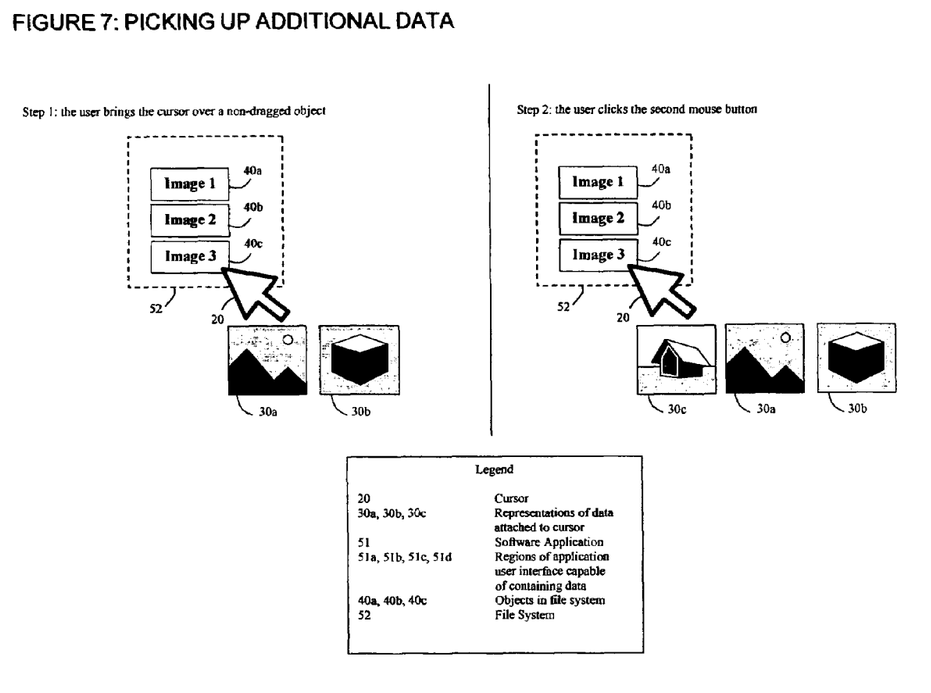
FIG. 7 depicts the steps involved in picking up data from an application to add them to a set of dragged data.

As shown in FIG. 7, the user

1. Uses an input device, such as a mouse 11, to bring the cursor 20 over an existing non-dragged data object 40c (in this example, a file holding a picture of a building).
2. Indicates his desire to pick up said non-ragged data object 40c, for example by pressing and releasing the second button on the mouse 11 (recall that clicking the first mouse button would drop the top-most dragged data object with visual representation 30*a*)

The non-dragged data object 40*c* is added to the collection of dragged objects 30 attached to the cursor 20, preferentially at the first position in said list.

Figure 8:
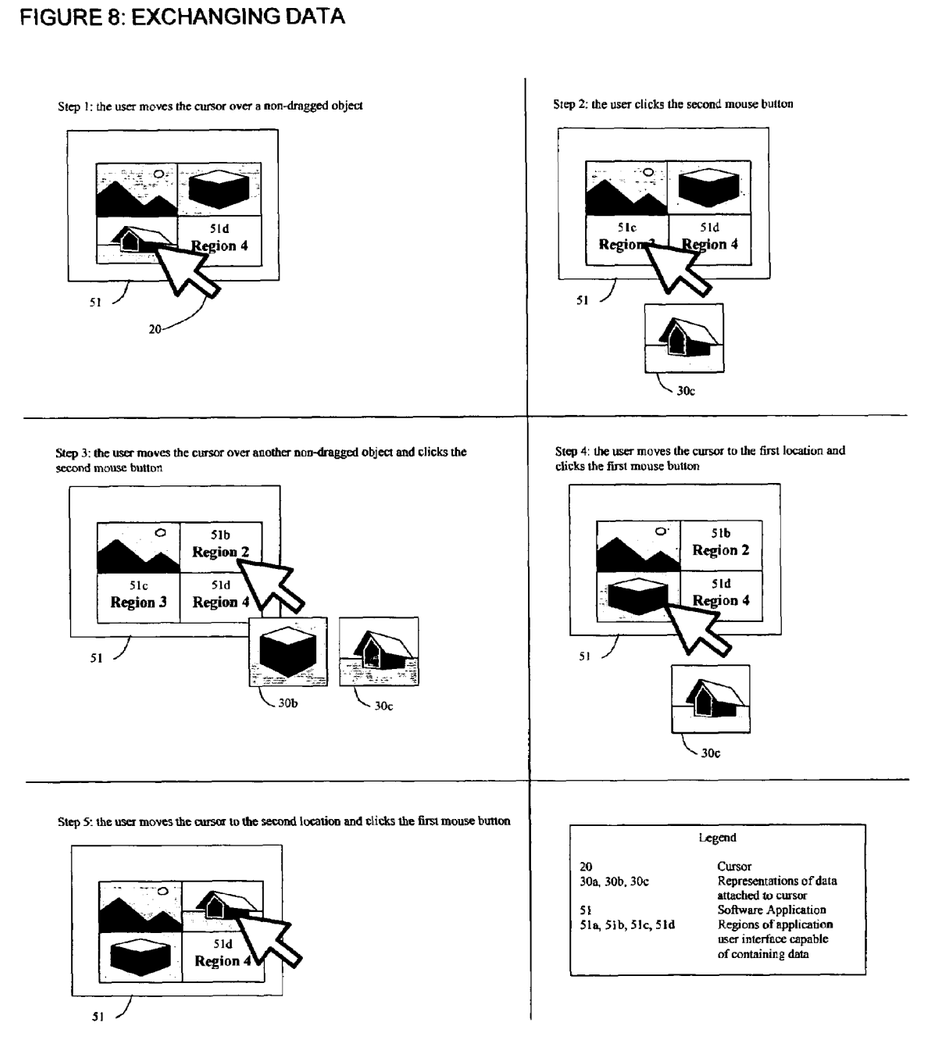
FIG. 8 depicts the steps involved in exchanging data from one location with another using a combination of sequential dropping and picking up data from an application.

As illustrated in FIG. 8, this functionality is of particular utility in exchanging the locations of two data objects, as follows:

1. The user picks up the first data object 40*c* by means of the steps described above
    (a representation of said object 30*c* appears attached to the cursor 20)
2. The user picks up the second data object 40*b* by means of the steps described above
    (a representation of said object 30*b* appears attached to the cursor 20, for example inserted before object 30*b*)
1. The user moves the pointing device 11 such that the cursor 20 is over the original location of said first data object 40*c*
2. The user presses and releases the button on the mouse 11
    (Said second data object 40*b* is cropped)
    (40*b* appears in the location that 40*a* once held)
    (The visual representation 30*b* of said second data object 40*b* is removed from the collection of dragged objects 30 attached to the cursor 20)
3. The user moves the pointing device 11 such that the cursor 20 is over the original location of said second data object 40*b*
4. The user presses and releases the button on the mouse 11
    (Said first data object 40*c* is dropped)
    (40*c* appears in the location that 40*b* once held)
    (The visual representation 30*c* of said first data object 40*c* is removed from the collection of dragged objects 30 attached to the cursor 20)

Removing from the List of Dragged Items

In another embodiment of the invention, the user has the ability to remove objects from the set of dragged data objects. This is accomplished by a user action, such as pressing the 'delete' key, while in drag-and-drop mode. This action results in the removal of the first object in the set of dragged objects and updating of the display of subsequent dragged objects.

Manipulating the List of Dragged Objects

In another embodiment of the invention, the user has the ability to manipulate the collection of dragged data objects in order to drop a data object other than that currently at the top-most position in the collection of dragged objects.

This enables the user to select an order to drop the dragged objects other than by the order in which they appear in the collection of dragged data objects, which is a useful capability.

Figure 9:
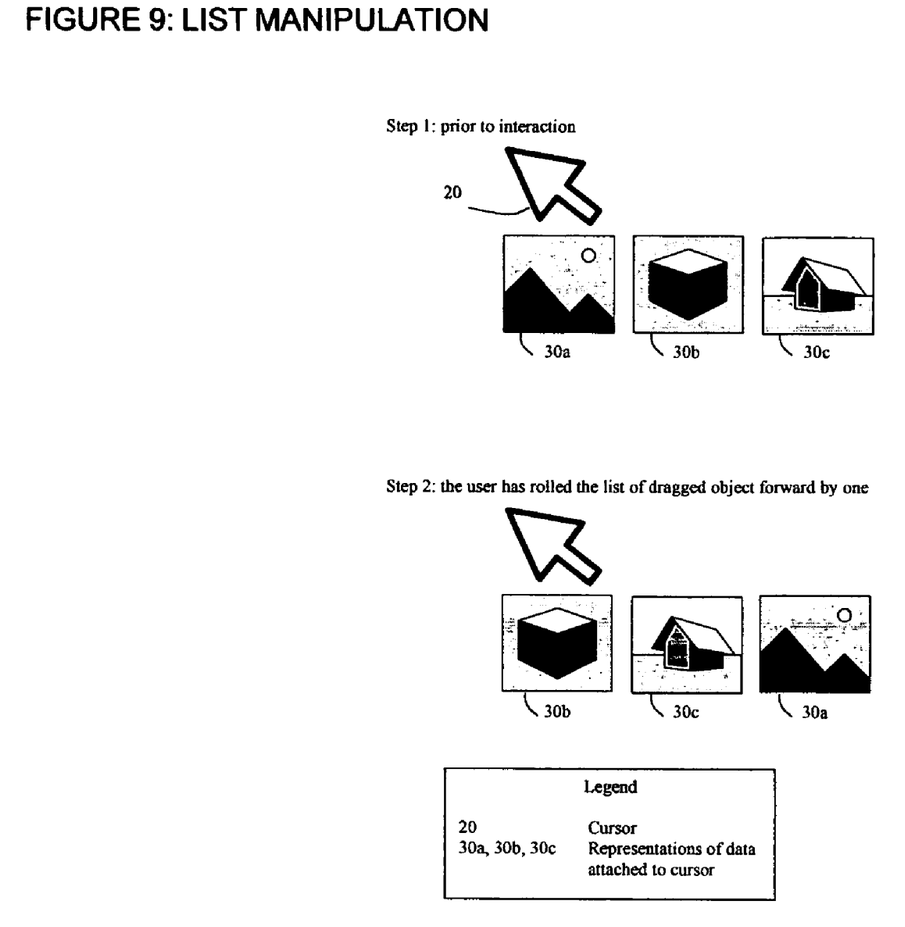
FIG. 9 depicts the steps involved in manipulating the order of a set of dragged data objects.

With reference to FIG. 9, the user accomplishes this by rotating the set of dragged objects 30*a*, 3*b*, 30*c* such that the next-to-be-dropped object (with visual representation 30*a*) is relocated in the sort order subsequent to the currently-last dragged object 30*c*, or the reverse (moving 30*c* to before 30*a* in the sort order).

In the preferred embodiment of the invention, the user accomplishes these actions by rolling a wheel on the mouse 11 in one direction to move the head to the tail of the list, and rolling the wheel on the mouse 11 in the opposite direction to move the tail to the head of the list.

In another embodiment of the invention, the user accomplishes these actions by pressing keys such as the left and right arrow keys respectively.

Enhanced Visual Feedback

Figure 10:
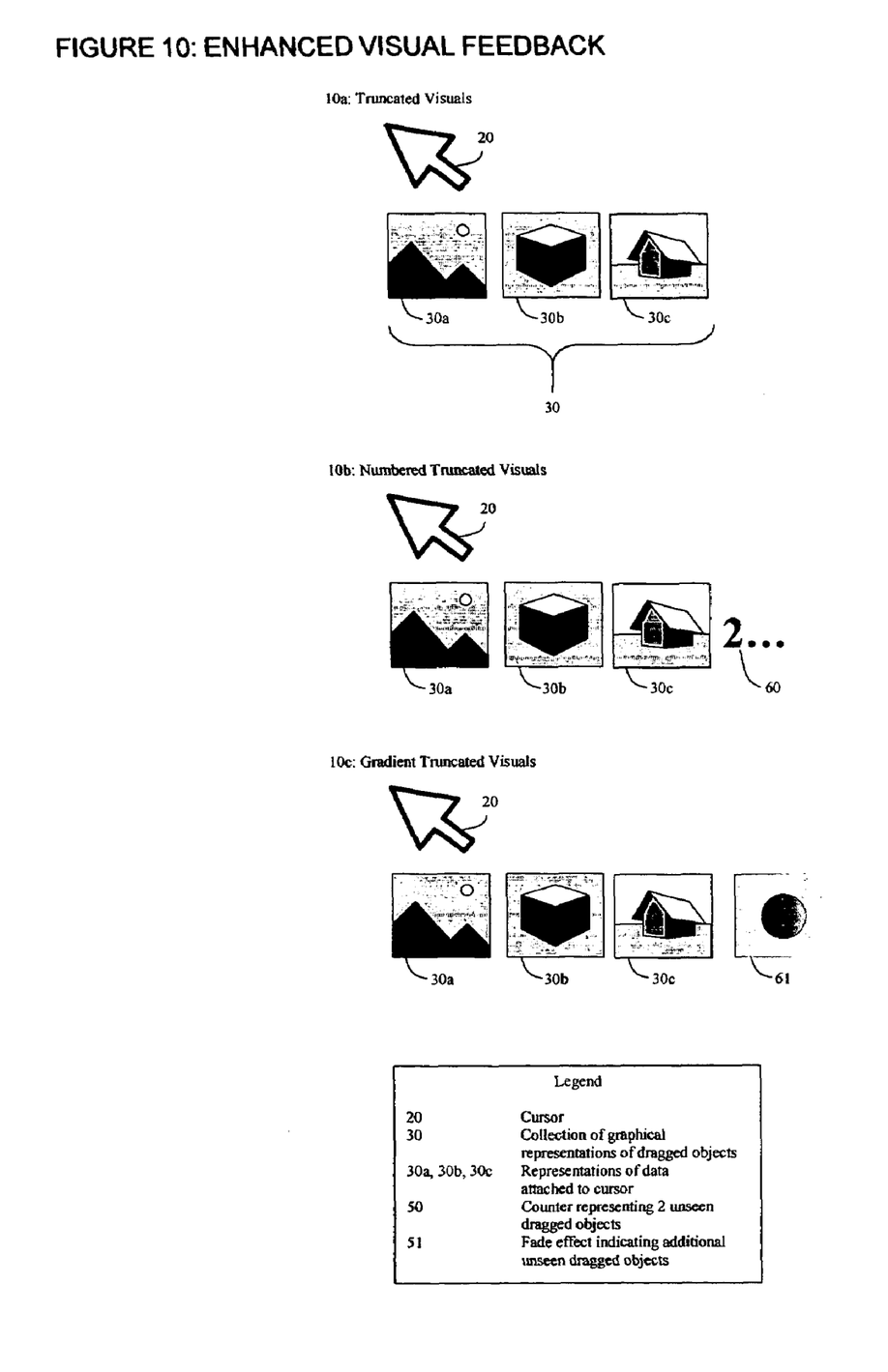
FIG. 10 depicts several alternative example visual feedback designs for indicating the presence of additional data that is not directly displayed in the interface.

Referring now to FIG. 10*a*, in another embodiment of the invention, the number of icons in the collection of visual representations 30 attached to the cursor 20 is truncated to the minimum of a fixed number or the number of objects remaining to be dropped. For example, if the developer of said system 1 had elected to truncate at three objects, then the user will see three objects in the collection 30 even if the user is dragging five objects but will see two objects if the user is dragging two objects.

In yet another embodiment of the invention, in order to reflect the number of objects remaining to be dropped, the system 1 may append a representation of a number 60 to the collection 30 attached to the cursor 11. For example, in FIG. 10*b* the system 1 is indicating that two objects remain to be dropped after the three visible for a total of five dragged objects.

In yet another embodiment of the invention, as illustrated in FIG. 10*c*, the presence of additional objects not visible to the user by reason of truncation as described above may be communicated by the rendering of a transparency gradient 61 on the final object in the truncated collection 30. This produces a visual cue that other objects remain invisible, reinforced to the user by the lack of a gradient on the last-in-sequence images in a collection 30 which is not truncated (for example, when the number of objects remaining to be dropped is fewer than the threshold for truncation described above).

This enhancement improves system performance (as only a subset of objects 30 are drawn for each refresh of the display 12 as opposed to the entire list) and also serves to balance the screen real estate consumed by the visual feedback with the display of the data in the application beneath it.

MODIFICATIONS AND ALTERNATE EMBODIMENTS

Having described the invention, it should be apparent to those of ordinary skill in the art that the foregoing is illustrative and not limiting. Numerous modifications, variations and alterations may be made to the described embodiments without departing from the scope of the invention by one of ordinary skill in the art and are contemplated as falling within the scope of the invention as defined by the appended claims.

We claim:

1. A method, operable on an application within a computer system, for streamlining manual dropping of a plurality of objects within a display using an input device, the display presenting a surface suitable for dropping objects into, the input device being capable of converting user input into a two-dimensional position to drive a position of a cursor on the display, the method comprising:

detecting user action of dragging at least two objects from another application or a source of draggable objects in the application over said display using said input device, said at least two objects forming a list of attached objects, and entering a dropping mode while the at least two objects are attached to the cursor;

while at least one of said at least two objects remains undropped, continuing to execute the following actions while in the dropping mode:

a) displaying a visual representation of each of said objects in said list proximal to a current position of said cursor, as a set of thumbnails, and b) when the user's intention to drop an object is detected, executing the following actions:

b1) processing dropping of a first object in said list of attached objects into said surface at a position dictated by the current position of said cursor,
b2) removing the visual representation of said dropped object from said set of thumbnails, and
b3) removing said dropped object from said list of attached objects;
c) performing steps b1), b2) and b3) for each object to be dropped, so that each of said at least two objects are sequentially dropped at unique locations independently of other objects in said list of attached objects; and
exiting said dropping mode when the list of attached objects is empty.

2. The method of claim 1 wherein the user is additionally able to abort or temporarily leave and re-enter the mode of dropping multiple objects, said method comprising:
signaling an intent to temporarily exit the mode of dropping multiple objects;
doing other work in the application;
signaling the intent to re-enter the mode of dropping multiple objects;
resuming the operation of the dropping mode at step a).

3. The method of claim 1 wherein the set of thumbnails are further arranged in a regular row extending from the right of the cursor position and sorted by selection order with the icon representing the next object to be dropped being located at a left-most position of said row.

4. The method of claim 1 wherein the set of thumbnails are further arranged in a regular column extending down from the cursor position and sorted by selection order with the icon representing the next object to be dropped being located at a top-most position of said column.

5. The method of claim 1 wherein the set of thumbnails representing the said list of dragged objects is further limited to a maximum predetermined number of objects.

6. The method of claim 5 wherein when the number of objects in the list of attached objects exceeds said maximum predetermined number of objects, a final object in the set of thumbnails representing the dragged objects is further modified to indicate that additional objects remain to be dropped beyond those that are visible in the attached set of icons, the method comprising one of:
applying an alpha gradient to one of the thumbnails such that the thumbnail fades to transparency
appending an icon indicating the presence of additional but unseen icons.

7. The method of claim 1 wherein the set of thumbnails attached to the cursor can be further manipulated by the user, the method comprising:
rolling a mouse wheel in one direction or pressing a key to send the object in a first position within the set of objects attached to the cursor to a last position and refreshing the displayed list of thumbnails; or
rolling the mouse wheel in a direction opposite the one direction or pressing a another key to send the object in the last position within the set of objects attached to the cursor to the first position and refreshing the displayed list of thumbnails.

8. The method of claim 1 wherein an object being dropped is an image, and wherein the thumbnails representing said image is a reduced-resolution version of said image.

9. The method of claim 1 wherein additional objects can be inserted into the list of attached objects, the method comprising:
moving the pointing device such that the cursor is positioned over a non-dragged object to be added to the list of attached objects,
detecting the user's intention to insert said non-dragged object into the list of attached objects; and
adding a representation of said added non-dragged object into the set of thumbnails.

10. The method of claim 1 wherein objects can be removed from the set of thumbnails and list of objects by:
signaling an intent to remove the first object;
removing said first object from said set of thumbnails; and
removing said first object from said list of attached objects.

11. A computer readable medium having computer instructions stored thereon for implementing a method of streamlining manual distribution of a plurality of objects within a display using an input device, the display presenting a surface suitable for dropping objects into, the input device capable of converting user input into a two-dimensional position to drive a position of a cursor on the display, the method comprising:
detecting user action of dragging at least two objects from another application or a source of draggable objects in the application over the display using the input device, said at least two objects forming a list of attached objects, and entering a dropping mode while the at least two objects are attached to the cursor;
while at least one of said two objects remains undropped, continuing to execute the following actions while in the dropping mode:
a) displaying a visual representation of each of said objects proximal to a current position of said cursor, as a set of thumbnails, and
b) when the user's intention to drop an object is detected, executing the following actions:
b1) processing dropping of a first object in said list of attached objects onto said surface at a position dictated by the current position of said cursor;
b2) removing the visual representation of said dropped object from said set of thumbnails; and
b3) removing said dropped object from said list of attached objects;
c) performing steps b1), b2) and b3) for each object to be dropped, so that each of said at least two objects are sequentially dropped at unique locations independently of other objects in said list of attached objects; and exiting said dropping mode when the list of attached objects is empty.

12. The computer readable medium of claim 11 wherein the user is additionally able to abort or temporarily leave and re-enter the mode of dropping multiple objects, said method comprising:
signaling an intent to temporarily exit the mode of dropping multiple objects;
doing other work in said application;
signaling the intent to re-enter the mode of dropping multiple objects;
resuming the operation of said dropping mode at step a).

13. The computer readable medium of claim 11 wherein the set of thumbnails are further arranged in a regular row extending from the right of the cursor position and sorted by selection order with the thumbnail representing the next object to be dropped being located at the a left-most position of said row.

14. The computer readable medium of claim 11 wherein the set of thumbnails are further arranged in a regular column extending down from the cursor position and sorted by selection order with the thumbnail representing the next object to be dropped being located at a top-most position of said row.

15. The computer readable medium of claim 11 wherein the set of thumbnails representing the dragged objects that are displayed is further limited to a maximum predetermined number of objects.

16. The computer readable medium of claim 15 wherein the number of objects in the list of attached objects exceeds said maximum predetermined number of objects, a final object in the set of thumbnails representing the dragged objects is further modified to indicate that additional objects remain to be dropped beyond those that are visible in the attached set of thumbnails, the method comprising one of:
  applying an alpha gradient to one of the thumbnails such that the thumbnail fades to transparency; or
  appending an icon indicating the presence of additional but unseen icons.

17. The computer readable medium of claim 11 wherein the set of thumbnails attached to the cursor can be further manipulated by the user, the method comprising:
  rolling a mouse wheel in one direction or pressing a key to send the object in a first position within the set of objects attached to the cursor to a last position and refreshing the displayed list of thumbnails; or
  rolling the mouse wheel in a direction opposite the one direction or pressing a another key to send the object in the last position within the set of objects attached to the cursor to the first position and refreshing the displayed list of thumbnails.

18. The computer readable medium of claim 11 wherein the thumbnail representing said image is a reduced-resolution version of said image.

19. The computer readable medium of claim 11 wherein additional objects can be inserted into the list of attached objects, the method comprising:
  moving the pointing device such that the cursor is positioned over a non-dragged object to be added to the list of attached objects,
  detecting the user's intention to insert said non-dragged object into the list of attached objects, and
  adding a representation of said added non-dragged object into the set of thumbnails.

20. The computer readable medium of claim 11 wherein objects can be removed from the set of thumbnails attached to the cursor, the method comprising:
  signaling an intent to remove the first object;
  removing said first object from said set of thumbnails; and
  removing said first object from said list of attached objects.

* * * * *